March 19, 1963  A. BRAUN  3,081,756

FREE PISTON ENGINE

Filed April 30, 1959  2 Sheets-Sheet 1

March 19, 1963 A. BRAUN 3,081,756
FREE PISTON ENGINE
Filed April 30, 1959 2 Sheets-Sheet 2

United States Patent Office 3,081,756
Patented Mar. 19, 1963

3,081,756
FREE PISTON ENGINE
Anton Braun, Kingston, Ontario, Canada, assignor to Queen's University, Kingston, Ontario, Canada
Filed Apr. 30, 1959, Ser. No. 810,110
3 Claims. (Cl. 123—46)

This invention relates to free piston engines.

The intake valve system of conventional free piston engines frequently complicates the general design of the engine and is the source of many operating difficulties. Furthermore, the provision of starting means for free piston engines has always presented serious problems and usually results in complicated and costly mechanism.

It is a general object of this invention to provide a free piston engine of simplified design and operation wherein the normal intake valve system is eliminated with reduction in manufacturing costs, and increased life of the engine.

The invention broadly resides in the provision of air intake ports in the side walls of the compressor cylinders of a free piston engine, such ports being thereby subject to opening and closing by movement of the compressor pistons and such ports being located in predetermined position to provide satisfactory air intake.

Figure 1:
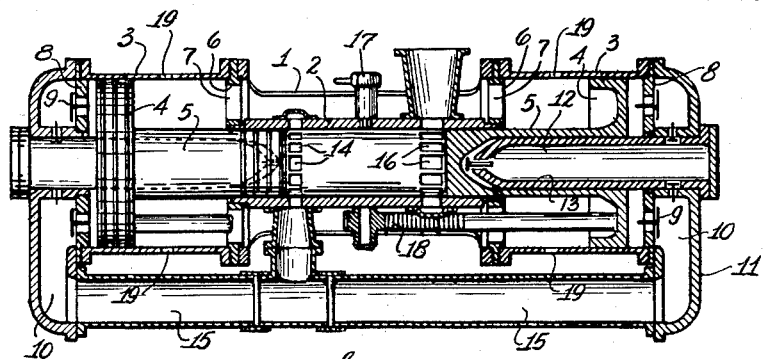
Figures 2, 3:
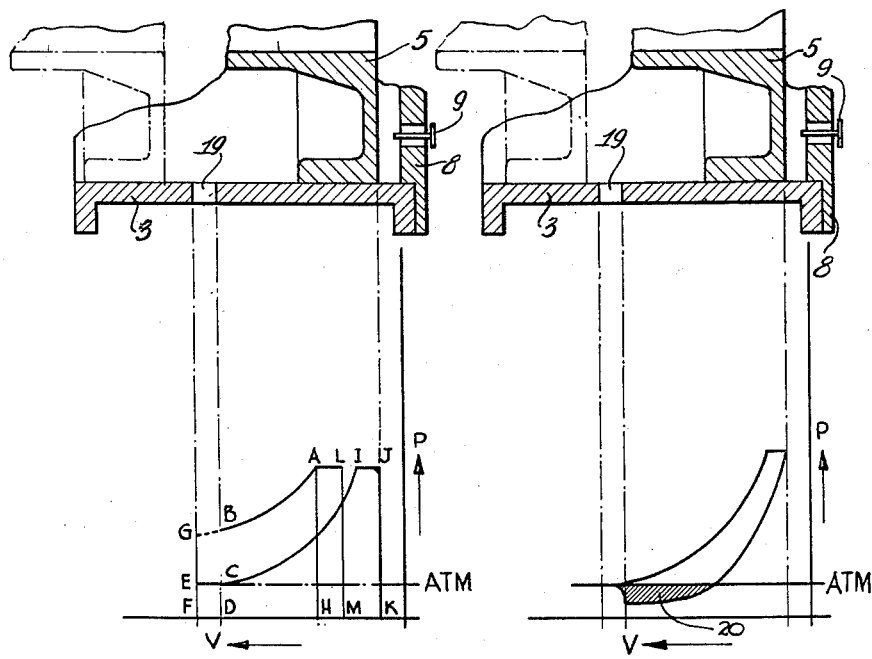
Figure 4:
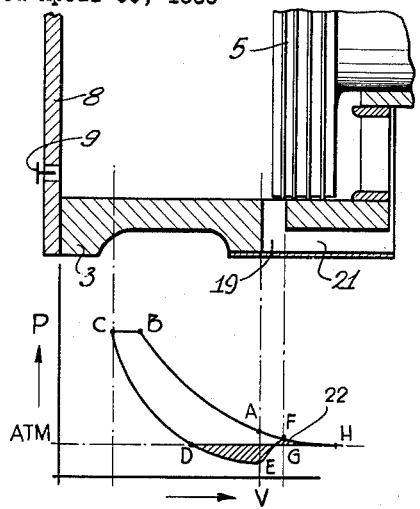
Figure 6:
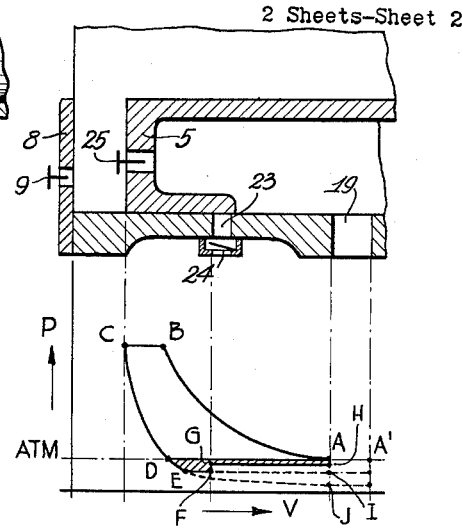
Figure 5:
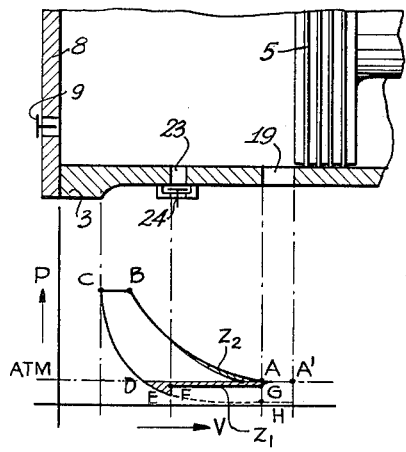
Figure 7:
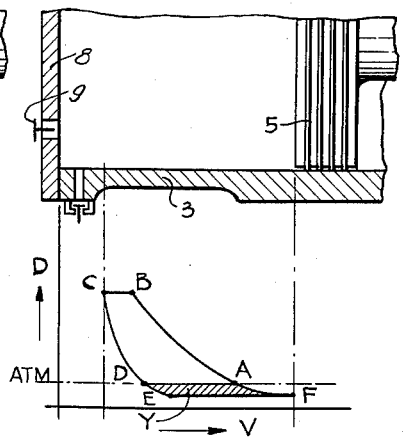

The invention will be described with reference to the accompanying drawings, in which FIGURE 1 is a sectional side elevation of a free piston engine in accordance with the invention, FIGURE 2 is an enlarged sectional view of a portion of the compressor cylinder and piston with accompanying P.-V. diagram, FIGURE 3 is a view similar to FIGURE 2 but with accompanying diagram illustrating the advantages in respect of starting the engine, FIGURES 4, 5 and 6 are sectional views of portions of compressor cylinder and piston, in various modified forms each with accompanying P.-V. diagram, and FIGURE 7 is a sectional view of a portion of compressor cylinder and piston, with accompanying P.-V. diagram representing losses due to flow resistance by use of normal intake valves.

In the drawing, the free piston engine illustrated comprises frame 1, power cylinder 2, compressor cylinders 3, a compressor piston 4 in each compressor cylinder and each having a power piston portion 5 for reciprocation in the power cylinder. A disc 6 defines the inner end of each compressor cylinder and openings 7 therein communicate with atmosphere. A closure plate 8 closes the outer end of each compressor cylinder and one way valves 9 therein provide communication of the interior of the cylinder with a passage 10 formed by a cover member 11. Bounce pistons 12 may be mounted in members 11 for reception in axial recesses 13 in the pistons 4. Power cylinder 2 has a plurality of ports 14 for intake of air under pressure delivered from the compressor cylinders by means of ducts 15 leading from the passages 10. The power cylinder is also provided with the usual exhaust ports 16 and fuel injection nozzle 17. A synchronizing mechanism is generally indicated at 18.

In accordance with the invention, intake air for the compressor cylinders is provided by means of a plurality of ports 19 in the circumferential wall of each compressor cylinder. The ports are circumferentially aligned and, in the modification illustrated in FIGURE 2, are located in the vicinity of the innermost position of the compressor piston. Thus, when the compressor piston on its inward or intake stroke has passed the position of atmospheric pressure in the compressor cylinder, a vacuum is created. The magnitude of this vacuum at the position of the pistons when they open the compressor inlet ports 19 can be adjusted by varying the clearance volume of the compressor. With the existence of this vacuum, at the time the ports 19 open, an effective air inlet through these ports takes place, thus providing the new air charge for the next compressor stroke.

The pressure-volume diagram of FIGURE 2 clearly indicates the action. The hatched area 20 in this diagram represents the loss due to drawing of a vacuum before the intake ports open. The magnitude of this loss can, as previously mentioned, be controlled by a proper choice of the clearance volume. If, however, considerations such as speed and size of the engine points to a small clearance volume, the loss due to vacuum would be unduly large for engines where high efficiency is required.

The pressure-volume diagram of FIGURE 3 demonstrates the advantages of using intake ports 19 in the compressor cylinders with particular regard to starting the engine. If a certain starting position of the piston is selected it can be determined what pressure behind the pistons is required to safely start the engine. If the compressor cylinder had no ports the air behind the piston would expand from point A to point G on the inward motion of the piston. The work done would have to be equivalent to area A, B, G, F, H, A.

With inlet ports the pressure expands from A to B and then to C and E, i.e., to approximately atmospheric pressure. The work done during the expansion stroke would be equivalent to area A, B, C, E, F, H, A, which is approximately that done during the expansion stroke of an engine without ports.

However, in the engine without compressor ports, the work to be done on the outward stroke would have to be equivalent to area G, B, A, L, M, F, G, and with a certain amount of energy released in the power cylinder to do this work the piston would not travel its full stroke and, possibly, not uncover the power cylinder inlet ports sufficiently to assure proper scavenging of the engine thus stopping the engine on the second stroke because of lack of fresh air in the power cylinder.

In an engine with compresosr cylinder ports, the same amount of energy released in the power cylinder would drive the pistons much farther apart since the work that has to be done on the outward stroke would in this case be equivalent to area E, C, I, J, K, F, E, which is equal to the work equivalent to area G, B, A, L, M, F, G previously mentioned but the piston will be shifted farther out and will thus uncover the power cylinder intake ports sufficiently to ensure proper scavenging and recharging of the power cylinder. Thus, the engine can carry through on its next strokes and even start safely at part load which results in a safer operation, less wear of the starting mechanism, and a lighter and more economical design of such starting mechanism.

As previously indicated, the starting of free piston engines presents serious problems and usually involves very complicated mechanism for the solution thereof. With the use of compressor cylinder intake ports in accordance with the invention, the range of possible starting points is greatly increased and as a result the starting mechanism can be considerably simplified.

FIGURE 4 illustrates a modification of the invention wherein the ports 19 communicate with an open duct 21 extending along the compressor cylinder. This duct is employed to "tune" the inlet ports in order to regain some of the energy required to create the vacuum. The pressure-volume diagram of this figure illustrates tuning effect which results in the gained area 22.

FIGURE 5 illustrates an arrangement wherein ports 23 controlled by valves 24 are employed in conjunction with the inlet ports 19. These valves are preferably relatively light in order to keep to a minimum the flow loss therethrough. It will be appreciated, however, that light valves would not withstand the high compression pressures at the end of the compression stroke of the compressor piston and, moreover, the temperatures at the end of the compression stroke could harm certain types of valves. However, by locating the valves 24, as shown, in a position of the stroke where the pressure and temperature do not exceed allowable limits within which such valves may safely operate, the need for expensive, heavy valves is avoided.

In the accompanying pressure-volume diagram, the loss is represented by the areas $Z_1$ and $Z_2$. The loss without valves 24 and with ports 19 only would have been equivalent to the area, A', A, D, E, H, G, A'. Referring to FIGURE 7, the loss with normal valves only would be equivalent to area $Y=A, D, E, F, A$. The loss with the arrangement of FIGURE 5 is equivalent to the cross-hatched area $Z_1=A', A, D, E, F, G, A'$ plus the cross-hatched area $Z_2$. The loss represented by $Z_2$ can be kept fairly small by keeping small the lost volume downstream of the intake valves, which is not difficult to do. Thus, the total loss may be less than in the case where normal valves are used and, moreover, the life of the engine can be improved and it can be manufactured at a lower cost.

Depending upon the size, shape, and tuning of the ports in the modification of FIGURE 5, part A', A, G, A' of area $Z_1$ may have different shapes, but the effects of such different shapes on efficiency and operational characteristics is very small.

FIGURE 6 illustrates an arrangement, which is similar to that shown in FIGURE 5 but wherein an additional smaller set of normal intake valves 25 are provided in the compressor piston. The result is a reduced loss area and consequently a more efficient engine.

With normal intake valves only the loss would be equivalent to area A, D, E, F, I, H, A; with normal intake valves plus valves 24 according to FIGURE 6, the loss would be equivalent to area A, D, E, F, G, H, A. With no intake valves but with intake ports only according to FIGURE 2, the loss would be equivalent to area A, D, E, J, I, H, A. The intake ports in addition to the intake valves according to FIGURES 5 and 6 assure definite charging of the compressor cylinders and simplify the starting procedure as previously described.

If, as indicated in FIGURE 6, the piston skirt is not uncovering the intake valves 25, the loss according to area $Z_2$ in FIGURE 5 can be eliminated since the energy stored in this area is available on the inward stroke as positive work in addition to the work done on the piston by the atmosphere.

I claim:
1. In a free piston engine having a power cylinder, a compressor cylinder connected to each end of said power cylinder and in axial alignment, each said compressor cylinder having a side wall and an outer end wall, and a pair of piston assemblies each having a compressor piston disposed for reciprocation in one of said compressor cylinders and a power piston disposed for reciprocation in said power cylinder, each said compressor cylinder being constantly open to atmosphere at its inner end, each said piston assembly having inward and outward strokes, means for admitting charging air to each said compressor cylinder comprising a series of circumferentially arranged ports open to atmosphere in said side wall of each said compressor cylinder, each said compressor cylinder having a clearance volume space defined by said outer end wall and a side wall portion thereof, and one of said compressor pistons at the termination of an outward stroke thereof, each said side wall portion being closed, each said compressor piston at the termination of said outward stroke thereof being disposed between one of said outer end walls and one of said series of ports, each said compressor piston at the termination of said inward stroke thereof being disposed inwardly of one of said series of ports, a plurality of compressor cylinder discharge ports in said outer end wall of each said compressor cylinder, and a one-way valve in each of said last-mentioned ports permitting air flow outwardly of said compressor cylinders.

2. A free piston engine as defined in claim 1, each said compressor cylinder side wall having a wall section forming an annular passage therein, said annular passage having one end thereof in communication with one of said series of ports and the other end thereof in communication with atmosphere.

3. A free piston engine as defined in claim 1, including at least one additional port in each said compressor cylinder side wall disposed between one of said first series of ports and one of said compressor cylinder outer end walls, said additional port having a one way valve therein permitting air flow inwardly of said compressor cylinders, each said compressor piston at the termination of said outward stroke thereof being in overlying relation to said additional port to close said additional port.

References Cited in the file of this patent

UNITED STATES PATENTS

| | | |
|---|---|---|
| 2,200,892 | Pateras Pescara | May 1, 1940 |
| 2,237,082 | Pateras Pescara | Apr. 1, 1941 |
| 2,478,375 | Davis | Aug. 9, 1949 |
| 2,479,044 | Kalitinsky | Aug. 16, 1949 |
| 2,912,965 | Campbell | Nov. 17, 1959 |

FOREIGN PATENTS

| | | |
|---|---|---|
| 814,540 | Germany | Jan. 24, 1952 |